United States Patent [19]

Johnston

[11] 4,202,081
[45] May 13, 1980

[54] METHOD OF ASSEMBLING A PRESSURE SENSOR

[75] Inventor: Samuel A. Johnston, Fontana, Wis.

[73] Assignee: Borg Instruments, Inc., Delavan, Wis.

[21] Appl. No.: 887,049

[22] Filed: Mar. 16, 1978

Related U.S. Application Data

[62] Division of Ser. No. 693,436, Jun. 7, 1976, abandoned.

[51] Int. Cl.² .................................................. H01G 5/18
[52] U.S. Cl. ....................................... 29/25.41; 29/593
[58] Field of Search ............... 29/25.42, 25.41, 593; 53/405, 432; 73/708, 718, 724, 729; 361/283

[56] References Cited

U.S. PATENT DOCUMENTS

| | | | |
|---|---|---|---|
| 2,714,703 | 8/1955 | Ruderfer | 73/724 |
| 3,602,047 | 8/1971 | Kistler | 73/718 |
| 3,697,835 | 10/1972 | Satori | 73/718 |
| 3,808,480 | 4/1974 | Johnson | 73/718 |

*Primary Examiner*—Carl E. Hall
*Attorney, Agent, or Firm*—Hosier, Niro & Daleiden, Ltd.

[57] ABSTRACT

A method of assembling a pressure sensor is disclosed. The sensor includes an aneroid capsule and an electrical circuit secured to opposite sides of a first insulator. The capsule and circuit are electrically interconnected. Second and third insulators are assembled on opposite sides of the first insulator bearing against respective ones of the aneroid capsule and the electronic sensing circuit. The subassembly so formed then is partially inserted into the open end of a hollow can having a closed opposite end with a port therein. A vacuum is applied to the port to suck the subassembly into the hollow can.

5 Claims, 11 Drawing Figures

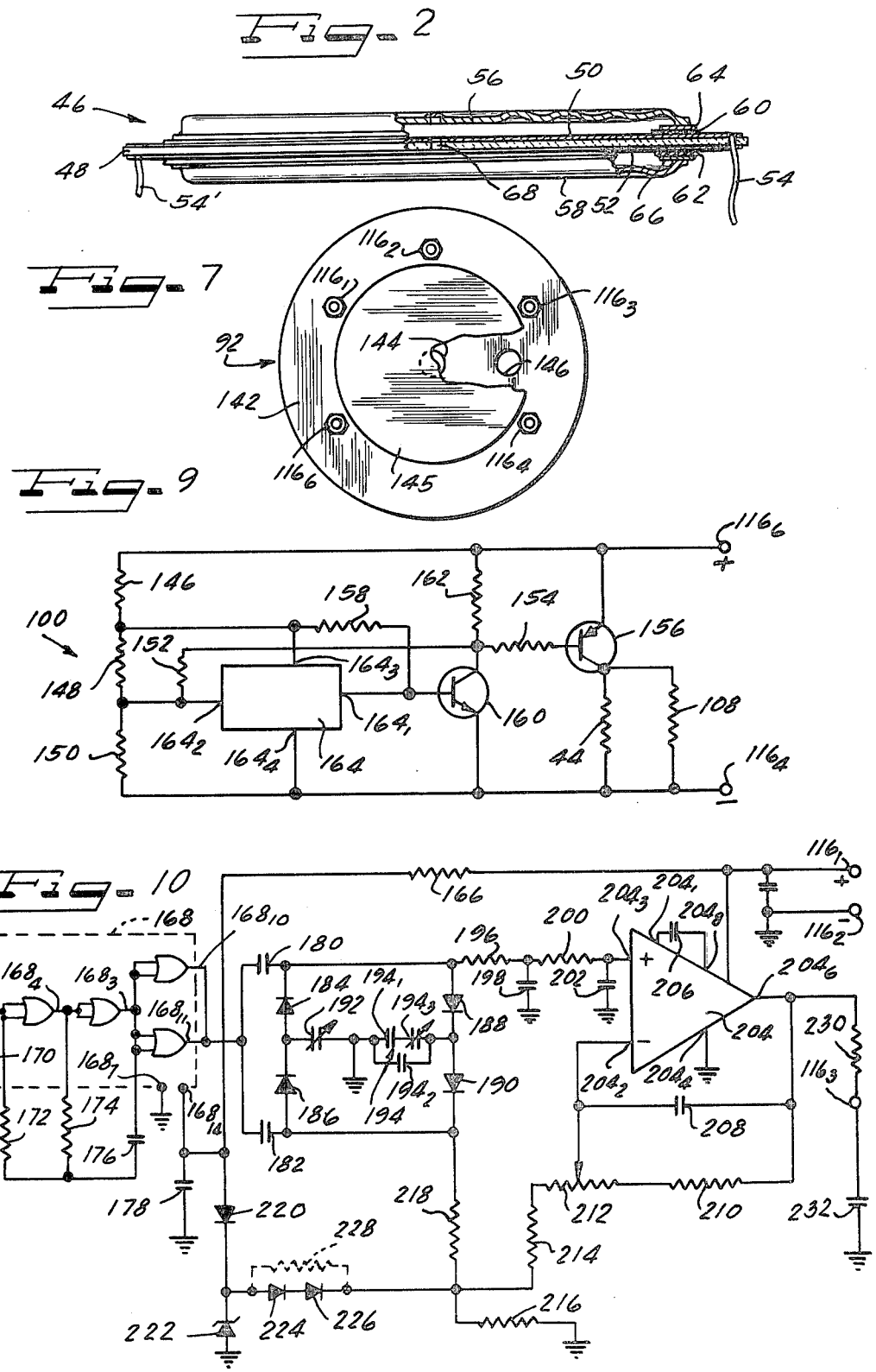

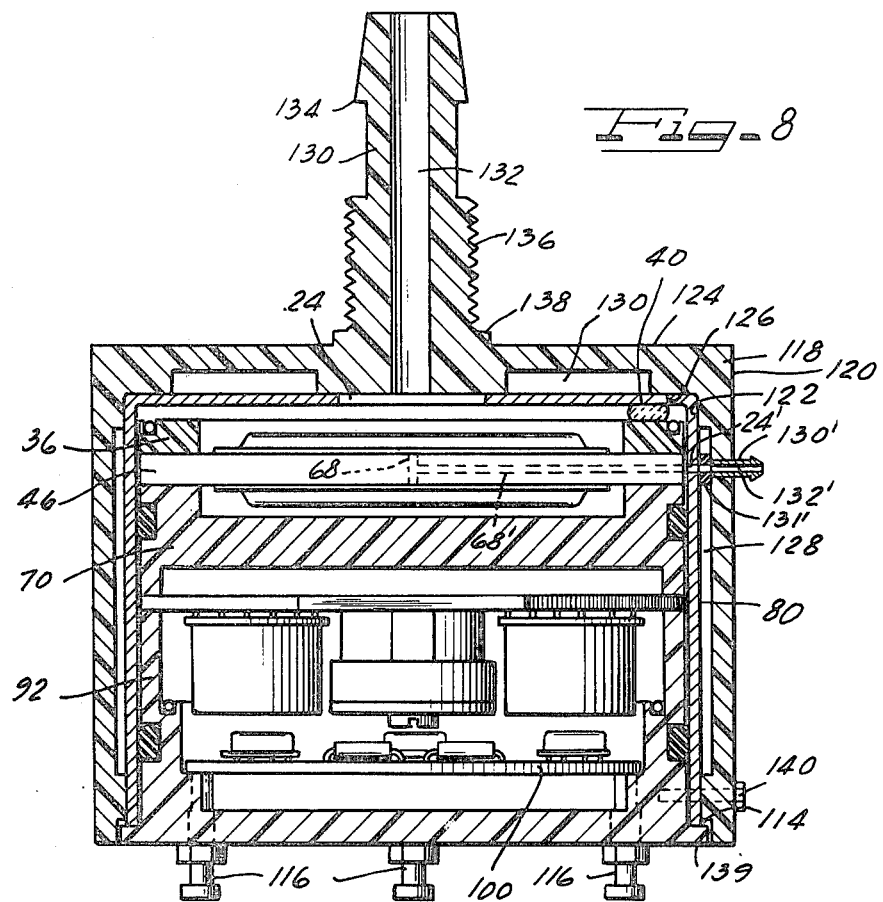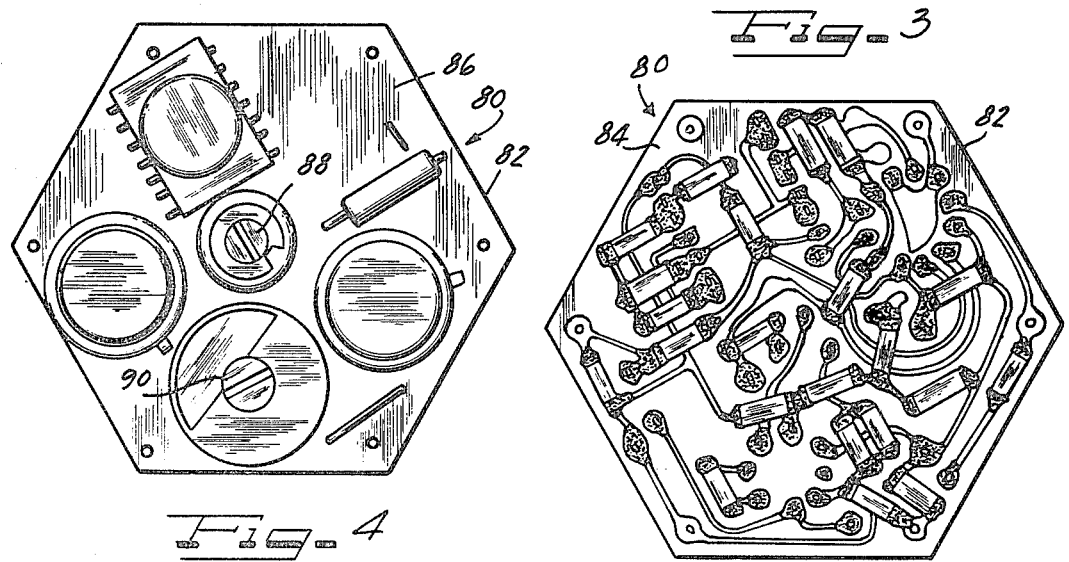

METHOD OF ASSEMBLING A PRESSURE SENSOR

This is a division of application Ser. No. 693,436 filed June 7, 1976, now abandoned.

BACKGROUND OF THE INVENTION

1. Field of the Invention

This invention relates to pressure sensors, and more particularly to the packaging of pressure sensors so as to eliminate or minimize deleterious ambient and environmental effects.

2. Description of the Prior Art

Small aneroid pressure sensors of the type having a capacitive pressure capsule are well known in the art. For example, one may refer to my U.S. Pat. Nos. 3,808,480, granted Apr. 30, 1974, and 3,880,009, granted Apr. 29, 1975, both assigned to Bunker Ramo Corporation, for discussions of the basic structure and operation of capacitive type pressure capsules. In the latter of these patents, it is explained that variations in pressure can be employed to change the capacitance of an appropriately constructed sensing device in which one of the plates is constructed in the form of a diaphragm. With one side of the diaphragm exposed to a pressure to be sensed, variations in that pressure will be reflected as changes in the capacitance between the diaphragm and a fixed capacitor plate.

As also set forth in that patent, a change in capacitance may be utilized to change the operating frequency of an oscillating circuit or a variable frequency signal generated can be applied to a discriminator to obtain an analog output, or to a gated counter to obtain a digital output. Circuits for accomplishing these functions are disclosed in my aforementioned patent U.S. Pat. No. 3,808,480, and in U.S. Pat. No. 3,295,360 and U.S. Pat. No. 3,595,084.

The pressure capsule per se and the electronic circuits per se for utilizing a pressure capsule to provide various output signals are not a part of the present invention, but are fully incorporated herein by the above references for a more complete appreciation of the present invention and to simplify the detailed description of the invention.

Heretofore, as evidenced by the above-cited patents, the art has been directed to refining pressure sensors in respect of size and weight reduction, manufacturing economy, and the like. In my U.S. Pat. No. 3,808,480, I also provided for a shielding of an integrated circuit device against electromagnetic interference by placing the integrated circuit between the metallic diaphragms of the pressure capsule.

SUMMARY OF THE INVENTION

With the ever increasing number of applications of pressure transducers of the general type described above, a plurality of ambient and environmental effects are encountered, many of which may cause erroneous electrical response. For example, transducers may be mounted in an environment which is subjected to temperature extremes. Along with this, it is sometimes required that the pressure sensor be mounted directly on a support which functions as a heat source and/or heat sink. For convenience, the term "heat source" should also be taken to mean a heat sink. Caustic and corrosive materials may also be found in the monitored fluid supply, and it is highly desirable to isolate electronic circuits from the effects of such materials.

Therefore, it is the primary object of the invention to provide a pressure sensor which is not adversely affected by ambient and environmental conditions.

A more specific object of the invention is to provide a pressure sensor in which the electronic sensing circuits are isolated from the pressure chamber which contains the pressure capsule.

Another object of the invention is to provide a pressure sensor which may be mounted in an environment which is subject to temperature extremes, with the attendant object of providing a pressure sensor having a housing in which the temperature is maintained substantially constant.

According to the invention, a pressure sensor is constructed from a number of modular subassemblies, each of which is constructed in accordance with electronic hybrid manufacturing techniques.

Another object of the invention is to provide an assembly and testing process in which subassemblies may be individually tested, secured together as a complete electrical package, inserted and sealed within a housing with the aid of the application of a modest vacuum, and then tested and adjusted as a total package.

According to the invention, a pressure sensor comprises a hollow metal can having a closed end and an open end with an aperture in the closed end for receiving fluid pressure. A first insulator closes the open end of the metal can and a second insulator is disposed adjacent the closed end of the can which has the aperture therein. The first and second insulators each include a groove supporting a respective heater, and a heater circuit is mounted on a shoulder of the first insulator. A third insulator is disposed within the metal can in a sealing relation with the interior thereof to provide chambers on opposite sides thereof. A pressure transducer is mounted on the third insulator in one chamber in communication with the aperture and an electronic sensing circuit is mounted on the third insulator within the other chamber and electrically connected to the pressure transducer. The second and third insulators are constructed of a material having a low thermal coefficient of dielectric constant and the electrical connections between the pressure transducer and the electronic sensing circuit extend through the third insulator in order to minimize stray capacitance and maintain a constant capacitance between the pressure transducer and the electronic sensing circuit. The seal provided by the third insulator protects the electronic heater circuit from the deleterious effects of materials in the fluid being sensed.

The hollow metal can, preferably constructed of copper, is provided with a fluid inlet which is in communication with the aperture. The fluid inlet is in the form of a tube having a passageway therethrough, the tube being adapted, as by an outer thread, for mounting on a support. The tube may be constructed, for example, from a metal such as brass.

In another embodiment the tube is integral with and constructed of the same material as a plastic insulating jacket which covers the hollow metal can. The jacket may be provided with a plurality of internal recesses which, together with the external surface of the can, form dead air insulating spaces which provide additional thermal resistance.

BRIEF DESCRIPTION OF THE DRAWINGS

Other objects, features and advantages of the invention, its organization, construction and operation will be best understood from the following detailed description taken in conjunction with the accompanying drawings, on which:

FIG. 2 is an elevational view, shown partially in section, of a pressure capsule which may be used in the pressure sensor of FIG. 1;

FIG. 3 is a plan view of one side of a circuitboard carrying a portion of the electrical components of the electronic sensing means;

FIG. 4 is a plan view of the other side of the circuitboard in FIG. 3, shown carrying other electrical components of the electronic sensing circuit;

FIG. 7 is an end view of the pressure sensor of FIG. 1 showing the electrical terminals, adjustment access holes, and a seal for the holes;

FIG. 8 is an elevational view, shown in section, of another pressure sensor constructed in accordance with the principles of the invention, specifically showing an outer insulating jacket;

FIG. 9 is a schematic circuit diagram of a heater circuit which may be utilized in practicing the present invention;

FIG. 10 is a schematic diagram of an electronic sensing circuit which may be used in practicing the present invention.

DESCRIPTION OF THE PREFERRED EMBODIMENTS

Figure 1:
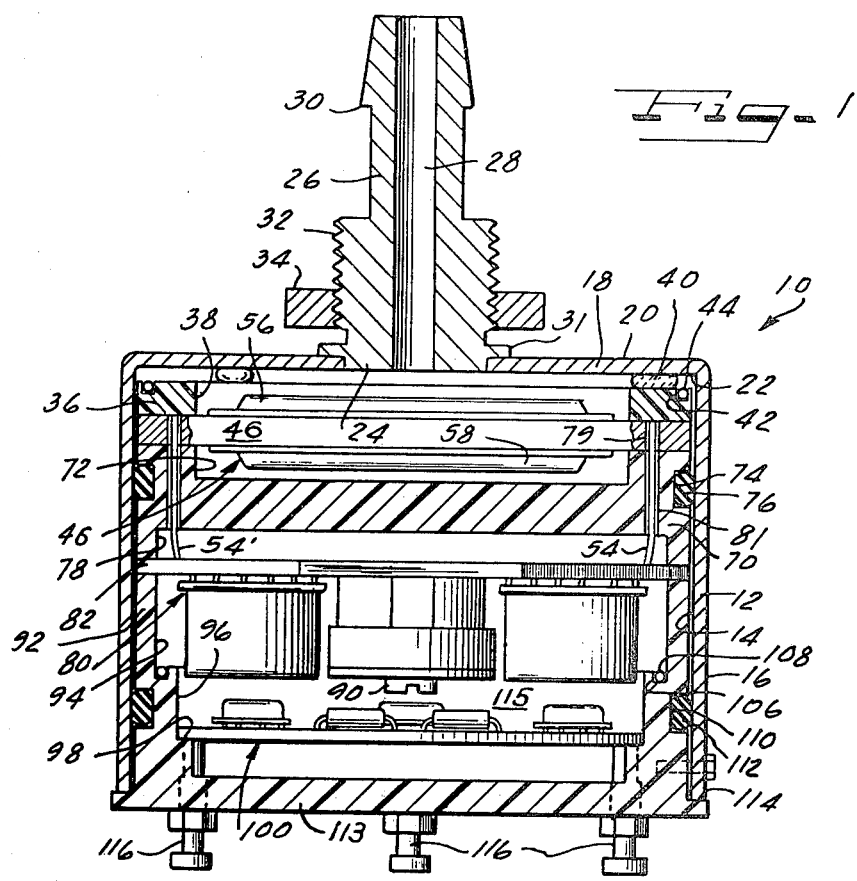
FIG. 1 is an elevational view, shown in section, of a pressure sensor constructed in accordance with the principles of the present invention.

Referring first to FIG. 1, a pressure sensor is illustrated at 10 as comprising a housing in the form of a hollow metal can having a cylindrical wall 12 with an inner surface 14 and an outer surface 16, and a closed annular end wall 18 having an outer surface 20, an inner surface 22 and an aperture 24. The can per se is open at its opposite end. A tubular stem 26 of a metal, for example brass, provides communication through the aperture 24 by way of a central fluid passageway 28. The stem 26 is adapted at 30 for connection to a rubber tubing or other fluid supply conduit. The stem 26 is secured in a gas-tight manner to the end wall 18, as by soldering, and includes a flange forming a shoulder 31 to bear against a support and fastening means, such as a thread 32 and a nut 34 for securing the sensor to the support.

Within the can is a plurality of elements, the innermost of which is a spacer ring 36 which, when inserted into the can, is pressed against a plurality, for example three, equally spaced dabs 40 of elastomeric material, for example RTV elastomeric material. The spacer ring includes a central aperture 38 and an annular groove 44 having a heating element 42 mounted therein. The heating element may be constructed as a coil of resistance wire.

For convenience in describing relationships of the various elements, the stem end of the pressure sensor will hereinafter be considered the upper end of the device.

A pressure capsule 46 bears against the lower surface of the spacer ring 36 and is generally illustrated in FIG. 2 as comprising a circuitboard 48 carrying a metal plate 50 on one side thereof and a metal plate 52 on the other side thereof as fixed capacitor plates. A metal diaphragm 56 is carried on the upper surface of the circuitboard 48 and a metal diaphragm 58 is carried on the lower surface of the circuitboard 48; they constitute movable capacitor plates. The metal diaphragms 56 and 58 are connected to respective electrodes 64 and 66 which, in turn, are connected to a common electrical lead 54'. The electrodes 64 and 66 are insulated from the plates 50 and 52 by respective insulators 60 and 62. The plates 50 and 52 are connected together with an electrical lead 54. The leads 54 and 54' are spaced from each other in order to minimize and stabilize stray capacitance therebetween.

Returning now to FIG. 1, a capsule cavity closure 70 formed of dielectric material bears against the lower surface of the pressure capsule 46 and includes a central recess 72 for receiving the lower metal diaphragm 58 while the upper metal diaphragm 56 is received in the aperture 38 of the spacer ring 36. The capsule cavity closure 70 includes a peripheral groove 74 having an O-ring 76 therein which provides a seal with the inner surface 14 of the metal can and thus divides the can into an upper chamber, (the pressure chamber), and a lower chamber which houses electrical components. The cavity closure isolates the electrical components from the deleterious effects of moisture, dirt or corrosive gases which may be in the fluid being monitored. For each electrical lead 54, 54', the capsule 46 and the capsule cavity closure 70 include aligned apertures 79, 81 for receiving the electrical leads therethrough. During assembly, these apertures are sealed with the leads therein, using any suitable compound. The material of the capsule cavity closure 70 and the spacer ring 36 is a low loss dielectric material which should be chosen to have a minimum change of dielectric constant for the range of environmental conditions in which the device is expected to operate, as, for example, exposure to temperature and humidity changes.

Referring again to FIG. 1, below the capsule cavity closure is an electronic sensing circuit 80 which is electrically connected, via the leads 54, 54', to the pressure capsule 46. As best seen in FIGS. 3 and 4, the electronic sensing circuit comprises a circuitboard 82 having an upper surface 84 carrying a plurality of electrical components which are received in the recess 78 (FIG. 1) and a lower surface 86 which carries a plurality of electrical components, including adjustble components as indicated at 88 and 90.

Figures 5, 6:
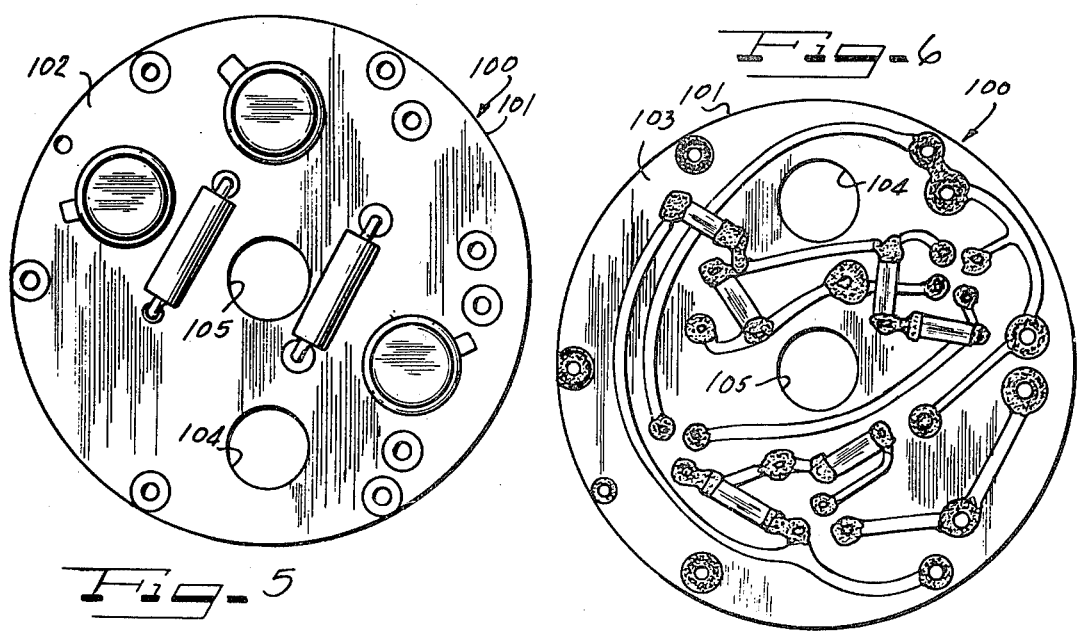
FIG. 5 is a plan view of one side of a circuitboard carrying some of the electrical components of the temperature controller circuit.
FIG. 6 is a plan view of the other side of the circuitboard of FIG. 5 shown carrying other electrical components of the temperature controller circuit.

As seen in FIG. 1, the circuitboard 82 of the electronic sensing circuit 80 rests on the upper edge of a base 92 which includes a recess 94 of a first diameter and an axially aligned recess 96 of a smaller diameter which receive therein the electrical components of the electronic sensing circuit which are located on the lower surface 86 of the circuitboard 82. The recess 96 has a shoulder 98 which provides support for a temperature controller 100. As best seen in FIGS. 5 and 6, the temperature controller 100 includes a circuitboard 101 having an upper surface 102 which carries electrical components of the temperature controller and a lower surface 103 which carries electrical components of the temperature controller. The circuitboard 101 includes a pair of apertures 104 and 105 for adjustment access to the elements 88 and 90 of the electronic sensing circuit 80.

The base 92 has an annular groove 106 with a heating element 108 mounted therein. The heating elements 44 and 108 are electrically connected to the temperature controller to maintain the temperature within the metal can at a predetermined temperature, such as 50° C. so that measurements made at lower ambients are independent of temperature.

The base 92 has a peripheral groove 110 with an O-ring 112 therein in a sealing relation with the inner surface 14 of the metal can, as an environmental seal. With the end wall 113, the base therefore provides a closure for the compartment 115 containing the electronic circuit devices 80 and 100.

The end wall 113 of the base 92 carries a plurality of electrical terminals 116 for supplying electrical power to the sensor and for providing an output signal, and has a peripheral flange forming a shoulder 114 which bears against the open end of the can.

As best seen in FIG. 7, the base 92 also includes a pair of apertures 144 and 146 which are aligned with the apertures 105 and 104 for access to the adjustments at 88 and 90. A sealing membrane, in the form of an adhesive label 145 is provided to cover and seal the apertures 144 and 146 after final adjustment of the pressure sensor.

FIG. 8 illustrates another embodiment of the invention which is similar to that illustrated in FIG. 1 with respect to the metal can and the components housed therein. The pressure sensor of FIG. 8, however, includes an external plastic jacket 118 having a cylindrical wall with an outer surface 120 and an inner surface 122 and an end wall having an outer surface 124 and an inner surface 126. The inner surface 122 is provided with a recess 128 and the inner surface 126 is provided with a recess 130. The jacket 118 provides both electrical and thermal insulation, and minimizes heat transfer with the external environment, while the recesses 128 and 130, together with the external surfaces of the metal can, provide dead air spaces and thus provide additional thermal resistance to reduce heat losses.

The insulating jacket 118 is provided with an integral stem 130 having a central fluid passageway 132 as a fluid input port in communication with the aperture 24 in the metal can. Again, the stem is adapted at 134 for connection to a fluid conduit, such as rubber tubing, and may include a thread 136 for use in securing the pressure sensor to a support. The jacket 118 may mount directly against the support or be provided with a shoulder 138 to stand-off the pressure sensor from the surface of the support. With the stem construction described, there is no metallic path from the enclosing can 80 to the panel on which the device is supported, and heat transfer is thus minimized.

The insulating jacket 118 includes an annular groove 139 for receiving the shoulder 114 on the peripheral edge of the base 92.

Fastening means, such as a number of screws 140, may be employed in securing the jacket, can and base; screws may similarly be used to secure the base within the can in the structure illustrated in FIG. 1.

The pressure sensor may be utilized to sense the differential between two pressures, in which case the pressure capsule is provided with a passageway 68' which extends to an aperture 24' in the sidewall of the can and by way of a stem 130' having a passageway 132' provides access to the space inside the diaphragms from a second fluid conduit which may be attached to the stem 130'. It is, of course necessary to provide a pressure seal at the interface between the pressure capsule and the metal can. This has not been illustrated but can be accomplished by way of sealing rings or an adhesive type of an elastomeric compound, such as silicone rubber or the like.

A heating control means is provided by temperature controller 100. The schematic diagram of FIG. 9 shows a pair of input terminals $116_6$ and $116_4$ for connection to an electrical supply. A voltage divider is formed by a plurality of resistors 146, 148 and 150 connected in series across the input terminals $116_6$ and $116_4$. The junction of the resistors 148 and 150 is connected by way of a resistor 152 and a resistor 154 to the base of a transistor 156 which has its emitter connected to the input terminal $116_6$ and its collector connected to the input terminal $116_4$ by way of a pair of parallel connected resistors constituted by the heating elements 42 and 108. A transistor 160 has a load resistor 162 connected between its collector and the input terminal $116_6$; its emitter is connected to the input terminal $116_4$. Therefore, the transistor 160 is connected as a voltage amplifier to provide driving current to transistor 156. A temperature-responsive control circuit of conventional type is represented by the block 164. The base of transistor 160 is connected to the collector of a transistor in the thermostatic control 164. Resistor 158 is the collector load for the latter transistor. Control 164 maintains the transistor 160 conductive and the transistor 156 likewise conductive, i.e., passing current through the heating elements 42 and 108, until the temperature at the control 164 reaches the value for which the control is set. At that point, the control removes a high potential at the terminal 164, and stops conduction of the transistors 160 and 156, thus cutting off the current through heating elements 42 and 108. Then, as the interior of the housing cools, the control 164 reapplies a high potential to turn on transistors 160 and 156, and the heating elements 42 and 108.

The control 164 may, for example be a standard LM 3911 circuit and the subscripts of the reference characters correspond to the terminals of that circuit. The transistor 160 may be a 2 N 2222, and the transistor 156 may be a 2 N 2907, as shown in the schedule of components.

Referring now to FIG. 10, a circuit diagram of a suitable electronic sensing circuit is illustrated as comprising fundamentally an oscillator 168, a bridge 180–194 and an amplifier 204. The capacitance of the pressure responsive capsule 46 is indicated at 192. Changes in the value of the capacitance 192 alter the balance of the bridge, which provides a + or − output. The bridge output signal is amplified by the amplifier 204. This type of circuit is well known in the art and will not be dealt with in detail herein. The oscillator 168 may be provided by an RCA CD4001 AK circuit, the diodes 184–190 by an RCA CA3039 circuit and the amplifier may be provided by an RCA CA3130 T circuit, the oscillator circuit and the amplifier circuit carrying terminal subscript designations which correspond to the actual terminal designations of these circuits.

One versed in the art will understand and appreciate the operation of the circuits of FIGS. 9 and 10 without further discussion; however, the following schedule of components will be helpful.

| SCHEDULE OF COMPONENTS | |
| --- | --- |
| Reference No. | Identification or Value |
| 44, 108 | 80 ohm |
| 146 | 2.7 K ohm |
| 148 | 51 K ohm |
| 150 | 47 K ohm |
| 152 | 20 M ohm |
| 154, 166 | 910 ohm |
| 156 | 2N2907 |
| 158 | 20 K ohm |
| 160 | 2N2222 |
| 162, 174, 196, 200, 218 | 10 K ohm |
| 164 | LM 3911 |
| 168 | CD 4001 AK |
| 170 | 15 pf |
| 172 | 50 K ohm |
| 176 | 68 pf |
| 178, 208 | 2200 pf |
| 180, 182, 198, 202 | 2700 pf |
| 184, 186, 188, 190 | CA3039 |
| $194_1$, $194_2$ | 6.8 pf |
| $194_3$ | 3-8 pf |
| 204 | CA 3130 T |
| 206 | 68 pf |
| 210 | 68 K ohm |
| 212 | 1 K ohm pot. |
| 214 | 3.3 K ohm |
| 216 | 6 K ohm |
| 220, 224, 226 | IN916 |
| 222 | IN825 |
| 230 | 150 ohm |
| 232 | 0.1 $\mu f$ |

Figure 11:
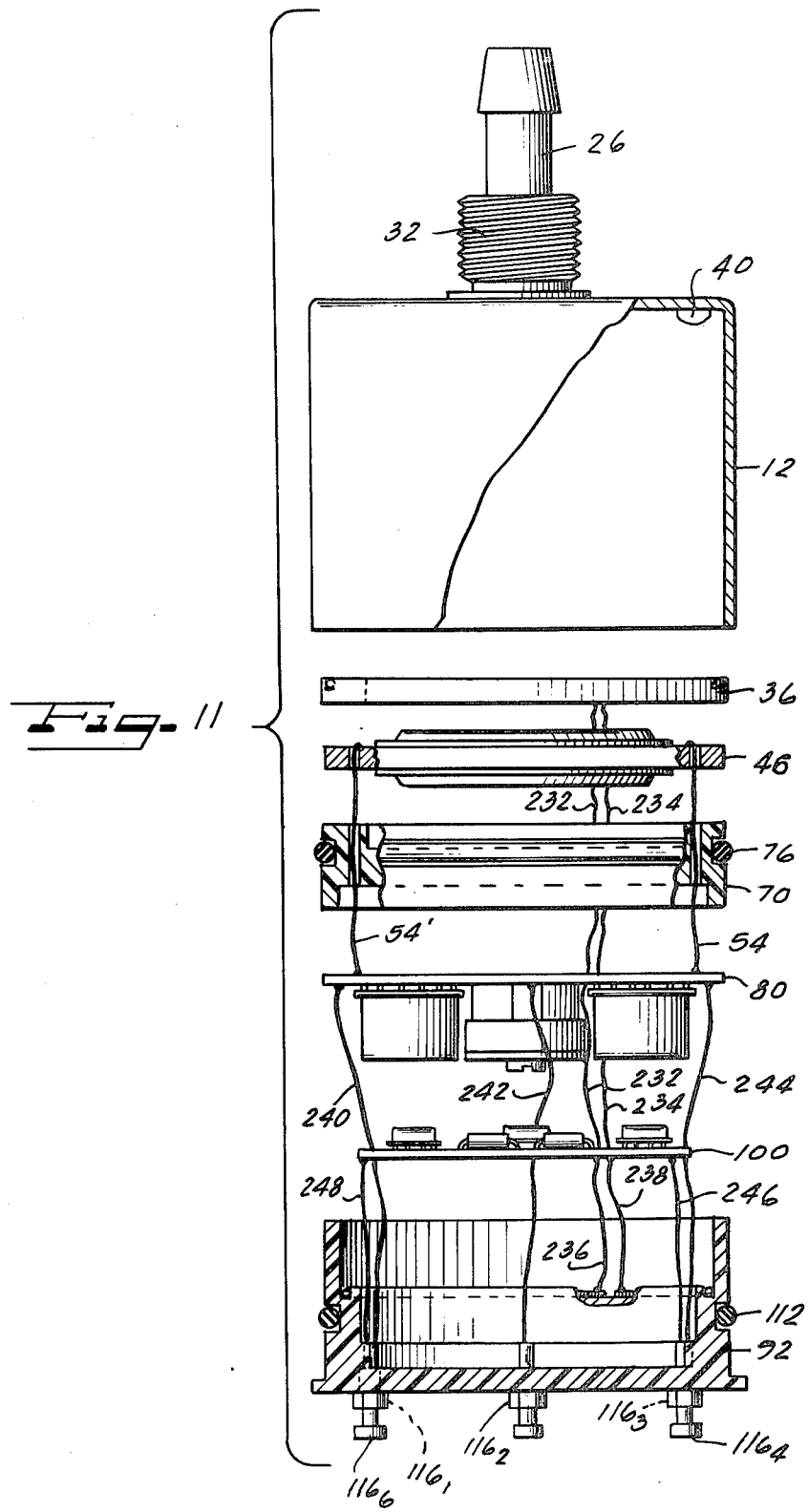
FIG. 11 is an exploded view showing the assembly procedure for a pressure sensor constructed in accordance with the present invention.

The major structural components mounted within the can are provided with an irregular outline (as shown for circuitboard 82 in FIGS. 3 and 4) or holes for receiving conductors therethrough (as shown in FIG. 11 for capsule 46 and closure 70). These conductors establish electrical connections between the two heating elements and the temperature controller, between the pressure capsule and the electronic sensing circuit, and provide power input to the electrical circuits and an output for an electrical signal at the terminals $116_2$–$116_3$. The electrical connections therefore extend from the innermost component to the outermost component and, when connected, provide an electrical subassembly which may be tested prior to placement thereof into the can. After this first electrical test, and after the subassembly has been placed in the can, a second electrical test can be made in which the adjustable elements 88 and 90 are operated via the apertures 104, 105, 144 and 146 to effect final "trimming" of the circuit. The pressure sensor is then sealed by applying the adhesive element 145 over the apertures 144 and 146. The adhesive element may be in the form of a label which identifies origin of manufacture and which identifies the terminals $116_1$–$116_6$.

In assembling the pressure sensor, according to the present invention, the following method has proven advantageous, although the order of placement and connections of the leads should not be taken to be limiting, but exemplary. Referring to FIG. 11, the electrical conductors 232 and 234 are connected between the upper heater and the circuitboard of the temperature controller 100. The leads 54 and 54' of the pressure capsule 42 are electrically connected to appropriate points on the circuitboard of the electronic sensing circuit 80. The electrical connections 236 and 238 are then established between the lower heating element and the same electrical locations as the conductors 232 and 234 on the temperature controller 100 such that the heating elements are connected in parallel as illustrated in FIG. 9. The terminal $116_1$ (shown behind the terminal $116_6$) is connected by way of an electrical conductor 240 to supply a positive potential to the electronic sensing circuit, while the terminal $116_2$ has the electrical conductor 242 connected thereto and to provide a reference potential, here ground, to the electronic sensing circuit. The electrical conductor 244 is extended between the output terminal of the electronic sensing circuit and the terminal $116_3$, illustrated behind the terminal $116_4$. The conductors 246 and 248 are then connected between the respective terminals $116_4$ and $116_6$ and the appropriate positive and negative input terminals of the circuitboard of the temperature controller 100. Although shown in an exaggerated exploded view, the subassembly extending from the spacer ring 36 to the base 92 is drawn together to form a complete electrical subassembly capable of being handled and tested. If desired, the subassembly may then be tested and adjusted prior to placement within the can.

Before placing the subassembly within the can, it is, of course, necessary to effect a fluid-tight seal of any passages which may exist between the upper and lower sides of the annular closure element 70. This may be done by the use of any suitable sealant compound.

A plurality, usually three, dabs of elastomeric material 40 such as RTV silicone are placed on the inner surface of the end wall of the can and, with the O-rings 76 and 112 in place, the subassembly is inserted into the can substantially to the point where the lower edge of the can engages the O-ring 76. A modest vacuum is then applied to the input port constituted by the stem 26 and the fluid passageway 28, or by the stem 130 and the fluid passageway 132, whereby a vacuum assist is provided to aid in inserting the subassembly into the can. Finally, the base 92 is adjusted to align the screw holes and the screws 140 are inserted and tightened to secure the housing.

Although I have described my invention by reference to certain exemplary embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of assembling a pressure sensor comprising the steps of:
    securing an aneroid capsule and an electrical circuit electrically connected to the capsule to opposite sides of a first annular insulator;
    securing a second annular insulator to the first annular insulator on the aneroid capsule side thereof;
    placing the assembly of connected components in an open end of a can which has an opposite closed end having an aperture therein;
    applying a vacuum to the aperture to suck the assembly into the can;
    connecting electrical leads from the electrical circuit to electrical terminals which extend through a third annular insulator; and
    securing the third insulator in the open end of the can.
2. The method of assembling a pressure sensor according to claim 1, comprising the step of:

testing the assembly prior to placing the same in the open end of the can for desired electrical response in response to applied pressure.

3. The method of assembling a pressure sensor according to claim 2, comprising the steps of:
   securing a first heater in a groove in the second annular insulator;
   securing a second heater in a groove in the third electrical insulator;
   securing a heater control circuit to the first insulator and electrically connecting the same to said first and second heaters.

4. The method of assembling a pressure sensor according to claim 3, comprising the step of:
   adjusting the operation of the electrical circuit through apertures in the third insulator.

5. A method of assembling a pressure sensor comprising the steps of:
   securing an aneroid capsule and an electronic sensing circuit to opposite sides of a first annular insulator and electrically interconnecting the aneroid capsule and the electronic sensing circuit, the first annular insulator having a peripheral seal;
   securing second and third annular insulators to the first annular insulator bearing against respective ones of the aneroid capsule and the electronic sensing circuit;
   partially inserting the subassembly so formed into the open end of a hollow can having a closed other end with a port therein; and
   applying avacuum to the port to suck the subassembly into the hollow can.

* * * * *